(12) United States Patent
Belohlav

(10) Patent No.: US 8,507,833 B2
(45) Date of Patent: Aug. 13, 2013

(54) SYSTEM AND METHOD OF BRAZING USING NON-SILVER METALS

(75) Inventor: Alan Belohlav, Belgium, WI (US)

(73) Assignee: Lucas-Milhaupt, Inc., Cudahy, WI (US)

( * ) Notice: Subject to any disclaimer, the term of this patent is extended or adjusted under 35 U.S.C. 154(b) by 891 days.

(21) Appl. No.: 12/523,112

(22) PCT Filed: Dec. 11, 2007

(86) PCT No.: PCT/US2007/025309
§ 371 (c)(1),
(2), (4) Date: Oct. 27, 2009

(87) PCT Pub. No.: WO2008/073419
PCT Pub. Date: Jun. 19, 2008

(65) Prior Publication Data
US 2010/0065549 A1    Mar. 18, 2010

Related U.S. Application Data

(60) Provisional application No. 60/869,471, filed on Dec. 11, 2006.

(51) Int. Cl.
*B23K 13/01* (2006.01)

(52) U.S. Cl.
USPC ............................................. 219/603; 148/23

(58) Field of Classification Search
USPC ............................................ 219/603; 148/23
See application file for complete search history.

(56) References Cited

U.S. PATENT DOCUMENTS

| | | | |
|---|---|---|---|
| 400,869 A | 4/1889 | Norton et al. | |
| 607,504 A | 7/1898 | Crowther | |
| 1,650,905 A | 12/1925 | Mills | |
| 1,629,748 A | 5/1927 | Stoody | |
| 1,865,169 A | 7/1927 | Candy | |
| 1,968,618 A | 2/1932 | Padgett et al. | |
| 2,005,189 A | 6/1935 | Herr | |

(Continued)

FOREIGN PATENT DOCUMENTS

| CA | 1303605 | 6/1992 |
|---|---|---|
| DE | 1298967 B | 7/1969 |

(Continued)

OTHER PUBLICATIONS

International Search Report dated Dec. 21, 2007; PCT/US06/043856 filed Nov. 9, 2006.

(Continued)

*Primary Examiner* — Thien F Tran
(74) *Attorney, Agent, or Firm* — Boyle Fredrickson, S.C.

(57) ABSTRACT

Systems and methods for brazing and soldering using low and non-silver based filler metals are described. The present invention includes methods and systems for brazing and soldering using copper based or bronze type filler metals in lieu of silver containing filler metals. The systems and methods provide advantages in that the bronze filler metals are substantially cheaper than silver alloy filler metals that are commonly used. Furthermore, the present invention uses a low-temperature, water-soluble flux that provides for easier cleanup after the completion of the brazing process. Additionally, the present invention provides significant advantages over traditional copper brazing in that it allows for a one-piece workflow and eliminates the need for large component pieces and filler metal inventories. This results in a significant decrease in capital expenditures and utility costs. Finally, the method described results in a significant decrease in the amount of equipment maintenance and capital investment that is necessary.

22 Claims, 3 Drawing Sheets

(56) References Cited

U.S. PATENT DOCUMENTS

| | | |
|---|---|---|
| 2,055,276 A | 9/1936 | Brownsdon et al. |
| 2,279,284 A | 4/1942 | Wassermann |
| 2,442,087 A | 5/1948 | Kennedy |
| 2,465,503 A | 3/1949 | Woods |
| 2,499,641 A | 3/1950 | Goody |
| 2,565,477 A | 8/1951 | Crowell et al. |
| 2,785,285 A | 3/1957 | Bernard |
| 2,927,043 A | 3/1960 | Stetson |
| 2,958,941 A | 11/1960 | Goerg |
| 3,033,713 A | 5/1962 | Bielenberg et al. |
| 3,051,822 A | 8/1962 | Bernard et al. |
| 3,077,131 A | 2/1963 | McShane |
| 3,162,551 A | 12/1964 | Short |
| 3,198,560 A | 8/1965 | Collins |
| 3,239,125 A | 3/1966 | Sherlock |
| 3,245,141 A | 4/1966 | Gruetjen |
| 3,290,772 A | 12/1966 | Crouch |
| 3,318,729 A | 5/1967 | Siegle et al. |
| 3,365,565 A | 1/1968 | Claussen |
| 3,452,419 A | 7/1969 | Hillert |
| 3,534,390 A | 10/1970 | Woods et al. |
| 3,542,998 A | 11/1970 | Huff |
| 3,555,240 A | 1/1971 | Gloor et al. |
| 3,558,851 A | 1/1971 | Takeshi |
| 3,610,663 A | 10/1971 | Lago |
| 3,619,429 A | 11/1971 | Torigai et al. |
| 3,620,830 A | 11/1971 | Kramer |
| 3,620,869 A | 11/1971 | Stump et al. |
| 3,639,721 A | 2/1972 | Hubbel |
| 3,642,998 A | 2/1972 | Jennings |
| 3,688,967 A | 9/1972 | Arikawa et al. |
| 3,695,795 A | 10/1972 | Jossick |
| 3,703,254 A | 11/1972 | Maierson et al. |
| 3,745,644 A | 7/1973 | Moyer et al. |
| 3,935,414 A | 1/1976 | Ballass et al. |
| 3,967,036 A | 6/1976 | Sadowski |
| 3,980,859 A | 9/1976 | Leonard |
| 4,041,274 A | 8/1977 | Sadowski |
| 4,121,750 A | 10/1978 | Schoer et al. |
| 4,134,196 A | 1/1979 | Yamaji et al. |
| 4,174,962 A | 11/1979 | Frantzreb, Sr. et al. |
| 4,214,145 A | 7/1980 | Zvanut et al. |
| 4,301,211 A | 11/1981 | Sloboda |
| 4,379,811 A | 4/1983 | Puschner et al. |
| 4,396,822 A | 8/1983 | Kishida et al. |
| 4,430,122 A | 2/1984 | Pauga |
| 4,447,472 A | 5/1984 | Minnick et al. |
| 4,493,738 A | 1/1985 | Collier et al. |
| 4,497,849 A | 2/1985 | Hughes et al. |
| 4,571,352 A | 2/1986 | Aoki |
| 4,587,097 A | 5/1986 | Rabinkin et al. |
| 4,587,726 A | 5/1986 | Holmgren |
| 4,624,860 A | 11/1986 | Alber et al. |
| 4,708,897 A | 11/1987 | Douchy |
| 4,762,674 A | 8/1988 | Cheng et al. |
| 4,785,092 A | 11/1988 | Nanba et al. |
| 4,800,131 A | 1/1989 | Marshall et al. |
| 4,831,701 A | 5/1989 | Yutaka |
| 4,900,895 A | 2/1990 | Marshall |
| 4,901,909 A | 2/1990 | George |
| 4,993,054 A | 2/1991 | Ujari |
| 5,098,010 A | 3/1992 | Carmichael et al. |
| 5,175,411 A | 12/1992 | Barber |
| 5,184,767 A | 2/1993 | Estes |
| 5,219,425 A | 6/1993 | Nishikawa et al. |
| 5,280,971 A | 1/1994 | Tokutake et al. |
| 5,316,206 A | 5/1994 | Syslak et al. |
| 5,360,158 A | 11/1994 | Conn et al. |
| 5,418,072 A | 5/1995 | Baldantoni et al. |
| 5,575,933 A | 11/1996 | Ni |
| 5,749,971 A | 5/1998 | Ni |
| 5,759,707 A | 6/1998 | Belt et al. |
| 5,781,846 A | 7/1998 | Jossick |
| 5,791,005 A | 8/1998 | Grabowski et al. |
| 5,806,752 A | 9/1998 | Van Evans et al. |
| 5,820,939 A | 10/1998 | Popoola et al. |
| 5,903,814 A | 5/1999 | Miura et al. |
| 6,093,761 A | 7/2000 | Schofalvi |
| 6,204,316 B1 | 3/2001 | Schofalvi |
| 6,244,397 B1 | 6/2001 | Kars |
| 6,248,860 B1 | 6/2001 | Sant'Angelo et al. |
| 6,264,062 B1 | 7/2001 | Lack et al. |
| 6,277,210 B1 | 8/2001 | Schuster |
| 6,317,913 B1 | 11/2001 | Kilmer et al. |
| 6,344,237 B1 | 2/2002 | Kilmer et al. |
| 6,376,585 B1 | 4/2002 | Schofalvi et al. |
| 6,395,223 B1 | 5/2002 | Schuster et al. |
| 6,409,074 B1 | 6/2002 | Katoh et al. |
| 6,417,489 B1 | 7/2002 | Blankenship et al. |
| 6,426,483 B1 | 7/2002 | Blankenship et al. |
| 6,432,221 B1 | 8/2002 | Seseke-Koyro et al. |
| 6,497,770 B2 | 12/2002 | Watsuji et al. |
| 6,608,286 B2 | 8/2003 | Jiang |
| 6,680,359 B2 | 1/2004 | Schoenheider |
| 6,713,593 B2 | 3/2004 | Ree et al. |
| 6,733,598 B2 | 5/2004 | Swidersky et al. |
| 6,830,632 B1 | 12/2004 | Fuerstenau et al. |
| 6,846,862 B2 | 1/2005 | Schofalvi et al. |
| 6,864,346 B2 | 3/2005 | Schoenheider |
| 6,881,278 B2 | 4/2005 | Amita et al. |
| 6,960,260 B2 | 11/2005 | Goto |
| 7,267,187 B2 | 9/2007 | Kembaiyan |
| 7,337,941 B2 | 3/2008 | Scott et al. |
| 7,442,877 B2 | 10/2008 | Kamata et al. |
| 7,858,204 B2 | 12/2010 | Campbell et al. |
| 2003/0203137 A1 | 10/2003 | Teshima et al. |
| 2004/0009358 A1 | 1/2004 | Scott et al. |
| 2004/0171721 A1 | 9/2004 | Esemplare |
| 2005/0008771 A1 | 1/2005 | Goto |
| 2005/0089440 A1 | 4/2005 | Kembaiyan |
| 2005/0129855 A1 | 6/2005 | Kamata et al. |
| 2007/0093574 A1 | 4/2007 | Esemplare |
| 2007/0251602 A1 | 11/2007 | Gagnon, Jr. et al. |

FOREIGN PATENT DOCUMENTS

| | | |
|---|---|---|
| DE | 8910519 U1 | 10/1989 |
| FR | 2349392 | 11/1977 |
| FR | 7612546 | 11/1977 |
| GB | 692710 A | 6/1953 |
| GB | 1180735 | 2/1970 |
| GB | 1481140 | 7/1977 |
| JP | 58000375 A | 1/1983 |
| JP | 62034698 A | 2/1987 |
| JP | 63040697 | 2/1988 |
| JP | 63303694 | 12/1988 |
| JP | 1066093 | 3/1989 |
| JP | 2179384 A | 7/1990 |
| JP | 3005094 A | 1/1991 |
| JP | 3204169 | 9/1991 |
| JP | 4371392 A | 12/1992 |
| JP | 6007987 A | 1/1994 |
| JP | 11347783 A | 12/1999 |
| WO | WO99/00444 | 1/1999 |
| WO | WO00/39172 | 7/2000 |
| WO | WO00/52228 | 9/2000 |
| WO | WO00/64626 | 11/2000 |
| WO | WO02/00569 | 1/2002 |
| WO | WO02/31023 | 4/2002 |
| WO | WO03/068447 | 8/2003 |
| WO | WO03/089176 | 10/2003 |
| WO | WO2004/061871 | 7/2004 |
| WO | WO2004/094328 | 11/2004 |

OTHER PUBLICATIONS

Written Opinion of the ISA dated May 10, 2008.; PCT/US06/043856 filed Nov. 9, 2006.

International Preliminary Report on Patentability dated May 14, 2008; PCT/US06/043856 filed Nov. 9, 2006.

International Search Report dated Dec. 4, 2008; PCT/US08/064871 filed May 27, 2008.

Written Opinion of the ISA dated Nov. 25, 2009; PCT/US08/064871 filed May 27, 2008.

International Preliminary Report dated Dec. 1, 2009; PCT/US08/064871 filed May 27, 2008.
International Search Report dated Apr. 9, 2008; PCT/US07/025309 filed Dec. 11, 2007.
Written Opinion of the ISA dated Jun. 11, 2009; PCT/US07/025309 filed Dec. 11, 2007.
International Preliminary Report dated Jun. 16, 2009; PCT/US07/025309 filed Dec. 11, 2007.
Belohlav, "Understanding Brazing Fundamentals," The American Welder; Sep.-Oct. 2000; Jul. 11, 2008; <http://www.aws.org/wj/amwelder/9-00/fundamentals.html>.
International Search Report dated Nov. 8, 2007, for PCT/US07/69636, filed May 24, 2007.
Written Opinion dated Nov. 8, 2007, for PCT/US07/69636, filed May 24, 2007.
International Preliminary Report on Patentability dated Nov. 28, 2008, for PCT/US07/69636, filed May 24, 2007.
Supplementary European Search Report for EP07762314 dated Dec. 5, 2012, 8 pages.
European Search Report for EP06837365 dated Jun. 22, 2012, 6 pages.

SYSTEM AND METHOD OF BRAZING USING NON-SILVER METALS

CROSS-REFERENCE TO RELATED APPLICATIONS

This international application claims the benefit of and priority to U.S. provisional application 60/869,471 filed Dec. 11, 2006 which is herein expressly incorporated by reference in its entirety.

BACKGROUND OF THE INVENTION

1. Field of the Invention

The present invention relates in general to the field of non-welding joinder techniques, such as brazing and soldering. More particularly, the present invention relates to a system and method of joining metals using non-silver or low-silver filler metals. Specifically, a preferred embodiment of the present invention relates to a system and method of brazing using copper based filler metals such as the alloys CDA 464, CDA 680, and CDA 681.

2. Discussion of the Related Art

As is known to those skilled in the art, brazing is a joining process whereby a filler metal is heated to a melting temperature which is lower than the melting temperature of the base metal and distributed between two or more close-fitting parts. The molten filler metal and flux interacts with the base metal and then cools to form a strong, sealed joint. A wide variety of filler metals and alloys may be used.

The use of copper based filler metals from the bronze family of filler metals is particularly well known in the art. Prior forms of bronze brazing, however, have required the use of high temperature fluxes. These high temperature fluxes leave behind a residue that is very difficult to remove. Removal is typically only accomplished by mechanical means such as wire brushing, chipping, or sandblasting. Furthermore, high temperature fluxes tend to form a heavy oxide layer on the base metal that leaves behind a charred or burned appearance that results in an unacceptable surface for coatings, such as painting or plating, and/or an otherwise aesthetic displeasing appearance.

Brazing with silver based filler metals has commonly been used as an alternative to bronze brazing because silver brazing does not suffer from the disadvantages that prior forms of bronze brazing have, such as, for example, the left behind residue and oxide layer formation on the base metal which is heavy, aesthetically displeasing, and difficult to remove. Brazing with silver based filler metal, however, is disadvantageous in that the silver alloys used are quite expensive.

Brazing with copper based and nickel based filler metals, in a controlled atmosphere furnace, is another form of brazing that is commonly used. Brazing with copper and nickel in a controlled atmosphere furnace is typically a batch process requiring large inventories of component pieces and filler metals. The furnaces typically need to run constantly in order to maintain a functional brazing atmosphere, which results in high utility costs and large component piece inventories. Further, large capital equipment expenditures are required to purchase and install and maintain a controlled atmosphere brazing furnace. Needless to say, it is desirable to provide a brazing method that uses less expensive filler metals than silver based filler metals, provides easier clean-up afterwards than traditional bronze brazing, and does not require the large capital and utility expenditures of controlled atmosphere furnace brazing.

SUMMARY AND OBJECTS OF THE INVENTION

The present invention is directed to filler metals for use in non-welding joinder processes that incorporate far less than typical, preferably no, silver components, and corresponding systems and methods of using such filler metals. The systems and methods include filler metals that are used in high-temperature joining applications with flux materials that are used in low-temperature joining applications. In some implementations, the high-temperature filler metals and low-temperature flux materials are used in a brazing procedure and the joint components are protected from the ambient by a shielding gas.

In some implementations, the systems and methods include using copper based filler metals, such as the alloys known commercially as CDA 464, CDA 680, and CDA 681. In so doing, the invention provides methods of brazing using a bronze filler metal, whereby a low cost filler metal alternative to traditional silver brazing is utilized, thereby decreasing the overall cost of the brazing process. It is noted that various non-silver filler metals of the invention are substantially less expensive than silver alloy filler metals that are commonly used.

The invention further provides methods of bronze brazing that require much less post-brazing cleaning than traditional bronze brazing methods. In some implementations, a low-temperature, preferably water-soluble, flux material is used which provides for easier cleanup after the completion of the brazing process. The present invention provides other significant advantages over traditional copper brazing in that it allows for a one-piece workflow and eliminates the need for large component pieces and filler metal inventories. This results in a significant decrease in capital expenditures, utility costs, and amount of equipment maintenance that is necessary. Furthermore, the present invention provides relatively higher strength brazed joints, as compared to those traditionally achieved through silver-type brazing.

In accordance with some aspects of the invention, the above advantages and objects are provided by a method of joining that includes preparing at least two base metals, providing a high temperature filler metal, namely, one that is suitable for high temperature joining and a low temperature flux material, namely, one that is suitable for low temperature joining. Exemplary low temperature fluxes include various post-braze water soluble flux, and other suitable low temperature fluxes.

The use of low temperature flux can be achieved in the present invention by using an induction heating process, which is very rapid and provided for a localized heat, thus minimizing the potential for the flux to burn out or become otherwise spent. Induction heating is desirable over other forms of heating because it is able to heat rapidly and it minimizes oxide formation during the heating process. Induction heating is known to be reliable in the brazing process and induction-heating equipment requires minimal maintenance, cost, and capital investment, when compared to other forms of heating such as controlled atmosphere heating.

The temperatures utilized in the inventive systems and methods utilized are selected based on the particular material composition of (i) the base metal(s), (ii) the filler metal(s), and (iii) the flux material. Preferably, the temperature is great enough to melt and flow the filler metal(s) whilst being low enough to avoid melting the base metal(s). It is noted that such temperatures will typically be greater than about 840 degrees Fahrenheit, optionally others, again depending on the particular material composition of the base and filler metals and/or flux material. Regardless of the particular temperature utilized, as desired, the resultant joint can be quenched in hot water to facilitate removal of excess flux from the base metals.

The filler metal is a low silver filler metal, having less than about 30 percent silver, optionally less than about 25 percent silver, optionally no silver. For example, in some implementations, the various objects are achieved by providing a bronze filler metal, such as CDA 464, CDA 680, or CDA 681, in the form of a flux cored perform or flux cored wire feed. Preferably, the flux used in the core will be a low temperature, water soluble flux, such as a proprietary post-braze water soluble flux offered by Lucas-Milhaupt under the "HANDY FLUX" line of products. The flux core wire is preferably that disclosed in U.S. Pat. No. 6,830,632. The low temperature flux may be easily removed in hot water after the brazing process is completed. Furthermore, because the flux is in the form of a flux cored wire, the flux residue will be minimized and localized at the braze joint.

The filler metal can be provided as a continuous length of flux cored or other wire, e.g., a solid bronze wire and a separate low temperature flux are used in the place of the flux cored wire, if desired. In some implementations, whether embodied as a flux cored wire or otherwise, the filler metal can be provided as a preformed geometric shape. Desirable preformed geometric shapes include, e.g., circles, ovals, and various polygonal configurations, depending on the particular configuration(s) of the parent metal or materials.

In some implementations the joint or heat-affected area is protected from the ambient by a shielding gas. The shielding gas can be any of a variety of suitable inert gases, such as nitrogen, can encompass, envelope, or occupy the heat-affected zone to reduce or minimize the effects of oxidation. Alternatively, shielding gases such as argon or carbon dioxide, a mixture of argon and carbon dioxide, or reducing gases such as hydrogen, may be used.

The low silver or non-silver, e.g., bronze brazing method of the present invention may be primarily used for steel-to-steel brazing applications where silver based filler metals are currently being used. Such applications include hydraulic tube fittings, automotive fluid transfer for cooling systems, fuel transfer, oil transfer, and exhaust transfer. However, as desired, the processes could also be used for joining numerous other similar and/or dissimilar base metal combinations, such as copper, stainless steel, and carbide.

In yet other embodiments, the methods of the present invention can be used as an alternative to brazing in a controlled atmosphere furnace using copper or nickel based filler metals. The proposed bronze brazing process would allow for a one-piece workflow, thus eliminating the need for large component pieces and filler metal inventories. The capital expenditures would be on the order of ten times less than that of traditional copper brazing in a controlled atmospheric furnace and would greatly reduce utility costs incurred.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
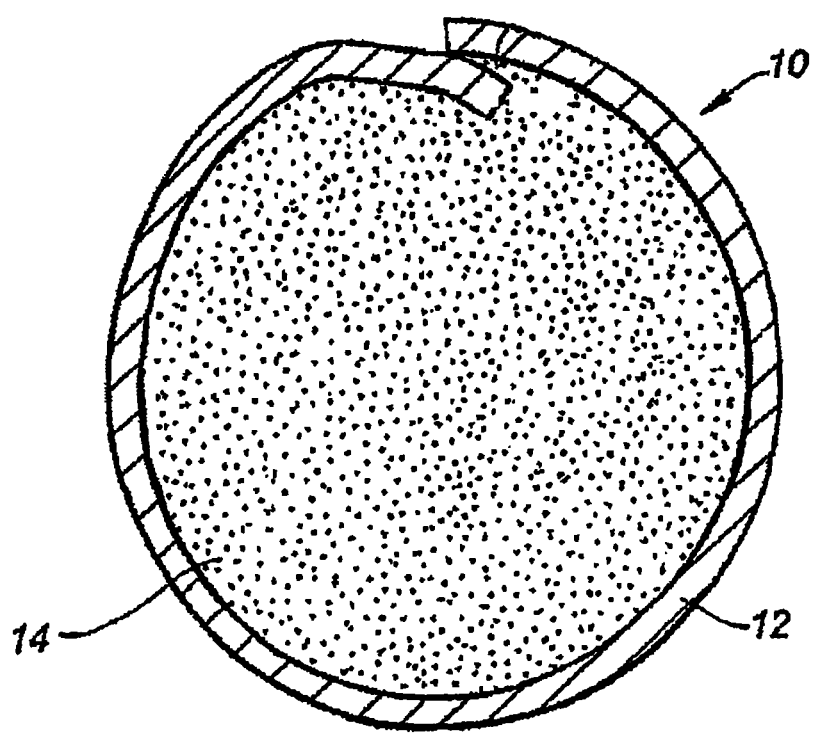
FIG. 1 illustrates a cross-sectional view of the bronze filler metal in the form of a flux cored pre-form or flux cored wire feed.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention relates to a method of brazing using low-silver or non-silver filler metals, preferably, copper based metals or alloys such as CDA 464, 680, and 681. CDA 464, 680, and 681 are well-known special alloys in the field of the present invention that comprise a combination of copper, tin, manganese, iron, silicon, nickel, and zinc. Such alloys are used in high temperature brazing, e.g., and are suitable for high temperature joining and therefore define high temperature filler metals.

The present invention can use the copper based or bronze filler metal, e.g., the high temperature filler metal, in the form of a flux cored pre-form or flux cored wire feed. The flux used in the core is any of a variety of ones that are used in low temperature brazing, e.g., are suitable for low temperature joining and therefore define low temperature brazing materials. Preferably, the low temperature brazing material utilized in the flux core is a post-braze water soluble flux so that the flux residue may be easily removed after brazing is completed by quenching or rinsing the brazed metals in hot water. Suitable low temperature brazing materials typically include as components, e.g., boric acid, inorganic fluorides and borates, and can further include elemental boron. For example, depending on the particular end use environments and associated conditions, it can prove desirable to provide at least one of, e.g., elemental boron in an amount of about 0.5% to 5%, an amphoteric surfactant such as deriphat 160 or other surfactants in an amount of about 0.3% to 5%, potassium bifluoride in an amount of about 30% to 45%, boric acid in an amount of about 25% to 40%, potassium flouborate in an amount of about 15% to 30%, potassium tetraborate in an amount of about 5% to 10%, and/or others as desired. Those skilled in the art well aware that the particular percentage composition of the above-listed and other flux constituents will vary between and are selected based on, e.g., the material composition of the base and filler metals and the particular intended end use and desired characteristics.

The base metals are heated preferably by a rapid heating source in the present invention such as induction-heating, laser heating, resistance heating, and even flame. Induction heating is preferred because it heats rapidly and minimizes the oxide formed during the heating process. The process is preferably conducted in the presence of a shielding gas such as nitrogen, argon, or carbon dioxide. The shielding gas acts to further minimize the effects of oxidation during the brazing process and can be used to prevent areas of localized overheating.

2. Detailed Description of Preferred Embodiments

Referring to the drawings, a method of bronze brazing is shown. Now referring to FIG. 1, a cross-sectional view of the brazing material to be used in the present invention is shown. As shown in FIG. 1, a filler metal is provided in the form of a flux cored pre-form or flux cored wire feed 10 such as that disclosed in U.S. Pat. No. 6,830,632 to Fuerstenau, et al., which is incorporated herein by reference. Although a wire loop is shown, any shape may be used. The flux wire 10 includes a rolled metal alloy sheet 12 that defines an encasing that extends around the flux material 14 of the core.

The filler metal is a non-silver or low-silver (less than 20% silver) filler. Preferably, the filler metal is one of CDA, 464, 680, or 681. CDA 464 is a well-known special alloy that has a composition make-up as follows:

CDA 464 Composition:
copper 60.0%±1%
zinc 39.3%±1%
tin: 0.8%±1%

As mentioned, CDA 680 and 681 are well-known special alloys in the field of the present invention that consist of tin, manganese, copper, iron, silicon, zinc, nickel, lead, and aluminum. The preferred composition make-up is as follows:

CDA 680 Composition:
tin 0.75%-1.10%
manganese 0.01%-0.5%
copper 56.0%-60.0%
iron 0.25%-1.25%
silicon 0.04%-0.15%
zinc Remainder
nickel 0.2%-0.8%

The flux used in the core is preferably a low temperature, water-soluble, proprietary post-braze flux, such as HANDY FLUX braze offered by Lucas-Milhaupt. Optionally, the Lucas-Milhaupt Braze 250 can be used which has 25%±1% Silver, 52%±1% Copper, and 22.5%±1% Zinc.

Figure 2:
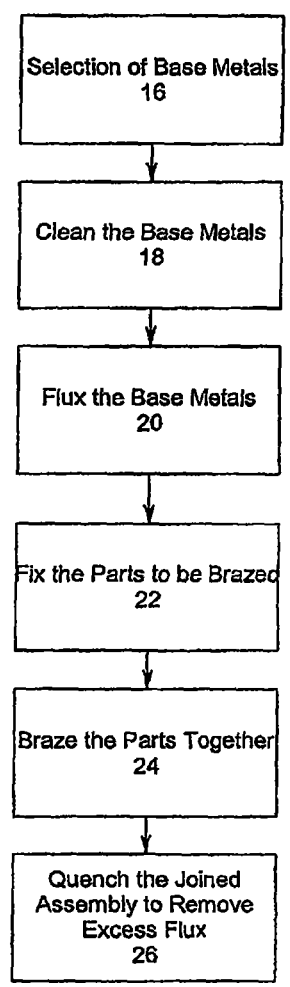
FIG. 2 illustrates a flow chart of the method of brazing according to the present invention.
Figure 3:
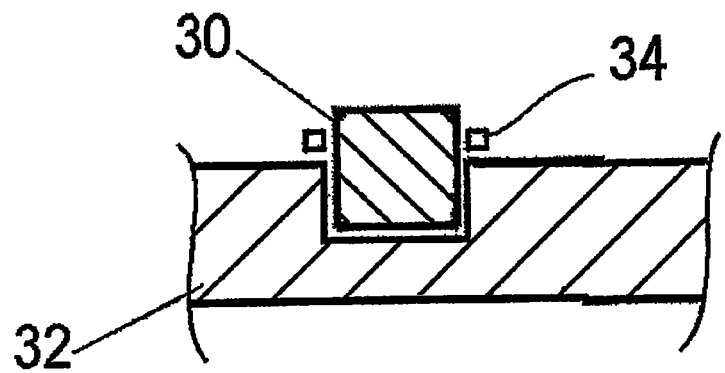
FIG. 3 is a schematic diagram illustrating the joining of two base metals by the brazing method of the present invention.

Turning now to FIGS. 2 and 3, a flow chart and a schematic diagram, respectively, of the brazing process of the present invention are shown. The brazing process generally comprises six steps. The first step 16, is the selection of the base metals to be joined. Next, the base metals are cleaned 18, fixed into position 22, and fluxed 20, in preparation for brazing. To minimize oxidation and flux burning, a shielding or reducing gas purges the heat-affected zone, e.g., by dissipation, before, during, and after the actual heating cycle. Next, the actual brazing 24 of the base metals takes place. An induction-heating source 28 is used to apply heat to the base metals 30, 32 to be joined. Brazing does not melt the base metals to be joined; rather the brazing temperature applied to the base metals should be lower than the melting points of the metals to be joined. Once the base metals are heated to an appropriate brazing temperature, the bronze filler metal 34 in the form of the above-mentioned flux cored perform or flux cored wire feed is applied to the area where the joint is to be formed. This may be done by simply holding a material such as a wire, a pre-placed flux cored filler material, or pre-form against the joint area. The heated base metals 30, 32 will melt off a portion of the filler metal 34, which will be drawn by capillary action throughout the entire joint area. After the filler metal 34 is applied to the joint area, the assembly is allowed to cool such that the filler material solidifies and a strong joint is formed.

Finally, the brazed assembly is cleaned 26 and the leftover flux residue is removed. As flux residues are typically chemically corrosive, failure to properly remove the residue may result in weakening of the joints. Therefore, the flux used in the present invention is preferably a water-soluble flux, and as such, the flux may be removed from the assembly by quenching it in hot water—preferably 120 degrees Fahrenheit or greater. Alternatively, the quenching process may be performed while the assembly is still warm as long as the filler metal has sufficiently solidified prior to the quenching.

There are virtually innumerable uses for the present invention, all of which need not be detailed here. All the disclosed embodiments can be practiced without undue experimentation. Moreover, although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. For example, the inventive brazing process could be enhanced by providing a somewhat different filler metal, such as a nickel containing filler metal, or some different flux material. In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although the flux described herein is a physically separate component, it will be manifest that it may be integrated into other components. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A method of joining using filler metals to form a joint between at least two base metals comprising the steps of:
   a. preparing at least two base metals to be joined;
   b. providing a high temperature filler metal that is suitable for high temperature joining at temperatures greater than 840 degrees Fahrenheit;
   c. providing a low temperature flux material that is designed for low temperature joining;
   d. applying a shielding gas as a barrier to the ambient;
   e. heating a joint portion of the base metals with a rapid heating cycle; and
   f. joining the at least two base metals with a high temperature brazing technique using the high temperature filler material and low temperature flux material to form the joint.

2. The method of claim 1 wherein quenching the base metals in hot water of 120 degrees Fahrenheit or greater removes excess flux from the base metals.

3. The method of claim 1 wherein the flux material is a post-braze water soluble flux.

4. The method of claim 1 wherein the filler metal is at least one of: a CDA 680 alloy and a CDA 681 alloy.

5. The method of claim 1 wherein the filler metal is provided as a continuous length of wire.

6. The method of claim 5 wherein the wire is a flux cored wire.

7. The method of claim 6 wherein the flux cored wire includes a post-braze water soluble flux material.

8. The method of claim 1 wherein the filler metal is provided as a preformed geometric shape.

9. The method of claim 8 wherein the preformed geometric shape is a circle.

10. The method of claim 8 wherein the preformed geometric shape is an oval.

11. The method of claim 8 wherein the preformed geometric shape is polygonal.

12. The method of claim 1 wherein the heating of the base metals is done by way of an inductive heating technique.

13. The method of claim 1 wherein the base metals are heated to a temperature that is adequate to melt and flow the filler metal, and low enough to prevent melting of the base metals.

14. The method of claim 1 wherein the filler metal is a bronze-based filler metal.

15. The method of claim 1 wherein the filler metal is a low silver filler metal.

16. The method of claim 15 wherein low silver filler metal has less than about 30 percent silver.

17. The method of claim 16 wherein the filler metal is a CDA 464 alloy.

18. The method of claim 15 wherein low silver filler metal has less than about 25 percent silver.

19. The method of claim 15 wherein low silver filler metal has no silver therein.

20. The method of claim 1 wherein the low temperature flux comprises at least one of:
   an elemental boron in an amount of 0.5% to 5%;
   an amphoteric surfactant including deriphat 160 in an amount of 0.3% to 5%;
   a potassium bifluoride in an amount of 30% to 45%;
   a boric acid in an amount of 25% to 40%;
   a potassium flouborate in an amount of 15% to 30%; and
   a potassium tetraborate in an amount of 5% to 10%.

21. A method of joining using filler metals to form a joint between at least two base metals comprising the steps of:
   a. preparing at least two base metals to be joined;
   b. a high temperature filler metal that is suitable for high temperature joining;
   c. fluxing the at least two base metals;
   d. heating the at least two base metals to a temperature which is less that required in welding processes defining a heat effected zone;
   e. purging ambient gasses adjacent the heat-affected zone by displacement using a shielding gas; and
   f. applying the high temperature filler metal to the heated base metals such that the filler metals are drawn into the area between the at least two base metals through capillary action to form a joint.

22. The method of claim 21 wherein the high temperature filler metal is at least one of: a CDA 680 alloy and a CDA 681 alloy.

* * * * *